United States Patent
Cernohous et al.

(10) Patent No.: US 6,903,173 B2
(45) Date of Patent: Jun. 7, 2005

(54) FLUORINATED POLYMERS

(75) Inventors: Jeffrey J. Cernohous, Hudson, WI (US); Ryan E. Marx, Cottage Grove, MN (US); James M. Nelson, Roseville, MN (US); Kenneth J. Hanley, Eagan, MN (US); Steven D. Koecher, New Brighton, MN (US)

(73) Assignee: 3M Innovative Properties Co., St. Paul, MN (US)

( * ) Notice: Subject to any disclaimer, the term of this patent is extended or adjusted under 35 U.S.C. 154(b) by 197 days.

(21) Appl. No.: 10/211,096

(22) Filed: Aug. 2, 2002

(65) Prior Publication Data

US 2004/0023016 A1 Feb. 5, 2004

(51) Int. Cl.$^7$ ............................................... C08F 114/18
(52) U.S. Cl. ....................... 526/243; 526/245; 526/248; 526/253
(58) Field of Search ................................. 526/243, 245, 526/248, 253

(56) References Cited

U.S. PATENT DOCUMENTS

| | | | |
|---|---|---|---|
| 2,803,615 A | | 8/1957 | Albrecht et al. |
| 3,252,932 A | | 5/1966 | Bolstad et al. |
| 3,787,351 A | | 1/1974 | Olson |
| 3,944,527 A | * | 3/1976 | McCown ..................... 526/243 |
| 4,415,615 A | | 11/1983 | Esmay et al. |
| 4,533,482 A | | 8/1985 | Bollinger |
| 5,002,676 A | | 3/1991 | Willis et al. |
| 5,298,532 A | | 3/1994 | Ali |
| 5,478,886 A | | 12/1995 | Kim |
| 5,571,655 A | | 11/1996 | Mahabadi et al. |
| 5,644,007 A | | 7/1997 | Davidson et al. |
| 5,780,565 A | * | 7/1998 | Clough et al. .............. 526/206 |
| 5,907,017 A | | 5/1999 | Ober et al. |
| 6,160,054 A | | 12/2000 | Schwindeman et al. |
| 6,184,338 B1 | | 2/2001 | Schwindeman et al. |
| 6,197,891 B1 | | 3/2001 | Schwindeman et al. |
| 6,221,991 B1 | | 4/2001 | Letchford et al. |
| 6,268,532 B1 | | 7/2001 | DesMarteau et al. |
| 6,309,752 B1 | * | 10/2001 | Dams et al. ................. 428/421 |
| 6,316,112 B1 | | 11/2001 | DuBois et al. |
| 6,319,881 B1 | | 11/2001 | Coolbaugh et al. |
| 6,350,820 B1 | | 2/2002 | Hahnfeld et al. |
| 6,664,354 B2 | * | 12/2003 | Savu et al. .................. 526/243 |
| 2001/0027234 A1 | | 10/2001 | Binder et al. |
| 2002/0007083 A1 | | 1/2002 | DesMarteau et al. |
| 2002/0010267 A1 | | 1/2002 | Klaerner et al. |
| 2002/0128336 A1 | | 9/2002 | Kolb et al. |

FOREIGN PATENT DOCUMENTS

| | | |
|---|---|---|
| DE | 19652312 A | 6/1998 |
| DE | 199 10 810 A1 | 9/2000 |
| DE | 199 10 811 A1 | 9/2000 |
| EP | 0 434 335 | 6/1991 |
| JP | 4-63820 | 2/1992 |
| JP | 04-063820 * | 2/1992 |
| JP | 4-110315 | 4/1992 |
| JP | 04-110315 * | 4/1992 |
| JP | 8-193107 | 7/1996 |
| JP | 10-130348 | 5/1998 |
| WO | WO 96/07522 | 3/1996 |
| WO | WO 96/07674 | 3/1996 |
| WO | WO 97/40929 | 11/1997 |
| WO | WO 00/42084 | 7/2000 |
| WO | WO 01/05578 | 1/2001 |
| WO | WO 01/58962 A1 | 8/2001 |
| WO | WO 01/91723 A2 | 12/2001 |
| WO | WO 02/081079 | 10/2002 |

OTHER PUBLICATIONS

US 6,492,477, 12/2002, Savu et al. (withdrawn)
Van Eck et al., Polymer Preprints, 2000, 41(1), 726–727.*
Marc R. Nyden, et al., "Development of a Continuous Flow Flame Test Extruder for Hight–Troughput Formulation and Screening of Flame Retardants and More Fire Resistant Materials", Fire Safety Developments Emerging Needs, Product Developments, Non–Halogen FR's, Standards and Regulations, Proceedings, Fire Retardant Chemicals Association, pp. 1–5, Mar. 12–15, 2000.
U.S. Appl. No. 09/500,155, Feb. 8, 2002, Continuous Process for the Production of Controlled Architecture Materials.
U.S. Appl. No. 09/824,330, Apr. 2, 2001, A Continuous Process for the Production of Combinatorial Libraries of Materials.
U.S. Appl. No. 10/211,219, Aug. 2, 2002, Continuous Process for the Production of Combinatorial Libraries of Modified Materials.
U.S. Appl. No. 10/211, 415, Aug. 2, 2002, Process to Modify Polymeric Materials and Resulting Compositions.
Article Abstract: Kassis et al., "XPS Studies of Fluorinated Acrylate Polymers and Block Copolymers with Polystyrene," *Macromolecules*, (1996), vol. 29, No. 9, pp. 3247–3254.
Article: Busse et al., "Synthesis of Amphiphilic Block Copolymers Based on *tert*–Butyl Methacrylate and 2–(N–Methylperfluorobutanesulfonamido)ethyl Methacrylate and Its Behaviro in Water," *Macromolecules*, vol. 35, (2002), pp. 178–184.

* cited by examiner

*Primary Examiner*—Helen L. Pezzuto
(74) *Attorney, Agent, or Firm*—Sean Edman

(57) ABSTRACT

Disclosed are block copolymers and end-functionalized polymers containing in their backbones at least one fluoro alkyl (meth)acrylate mer unit comprising —$C_6F_{13}$, —$C_4F_9$, or —$C_3F_7$.

27 Claims, No Drawings

FLUORINATED POLYMERS

TECHNICAL FIELD

This invention relates to fluorinated polymers.

BACKGROUND

The incorporation of fluorine into macromolecules can lead to materials with a variety of unique properties such as low surface energies, low dielectric constants, high incompatibility with other polymers, solubility in supercritical $CO_2$, and resistance to harsh chemical environments. Fluoropolymers are used commercially where the unique properties imparted by fluorine are necessary for the desired application (e.g., chemical resistant coatings, noncorrosive materials, antifouling coatings, interlayer dielectrics).

SUMMARY OF INVENTION

The present invention provides novel fluorinated block copolymers and end-functionalized polymers comprising the following Formula I:

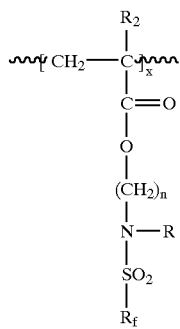

One aspect of the present invention is a composition comprising a block copolymer having at least one mer unit in its backbone having the Formula I structure wherein ∼∼∼ represents a bond in a polymerizable or polymer chain; $R_f$ is —$C_6F_{13}$ or —$C_3F_7$; R and $R_2$ are each independently hydrogen or alkyl of 1 to 20 carbon atoms; n is an integer from 2 to 11; and x is an integer of at least 1.

Another aspect of the present invention is a composition comprising a diene or styrene block copolymer having at least one mer unit in its backbone having the Formula I structure wherein ∼∼∼ represents a bond in a polymerizable or polymer chain; $R_f$ is —$C_6F_{13}$, —$C_4F_9$, or —$C_3F_7$; R and $R_2$ are each independently hydrogen or alkyl of 1 to 20 carbon atoms; n is an integer from 2 to 11; and x is an integer of at least 1.

Another aspect of the present invention is a composition comprising an ABC tri-block, star-branched block or random block copolymer having at least one mer unit in its backbone having the Formula I structure wherein ∼∼∼ represents a bond in a polymerizable or polymer chain; $R_f$ is —$C_6F_{13}$, —$C_4F_9$, or —$C_3F_7$; R and $R_2$ are each independently hydrogen or alkyl of 1 to 20 carbon atoms; n is an integer from 2 to 11; and x is an integer of at least 1.

Another aspect of the present invention is a composition comprising an end-functionalized polymer having in its backbone at least one mer unit having the Formula I structure wherein ∼∼∼ represents a bond in a polymerizable or polymer chain; $R_f$ is —$C_6F_{13}$, —$C_4F_9$, or —$C_3F_7$; R and $R_2$ are each independently hydrogen or alkyl of 1 to 4 carbon atoms; n is an integer from 2 to 10; and x is an integer of at least 1.

Another aspect of the present invention is a method of reducing the surface tension of a liquid comprising adding to said liquid less than 10 wt % of a surface active agent derived from a block copolymeric material having the Formula I structure wherein ∼∼∼ represents a bond in a polymerizable or polymer chain; $R_f$ is —$C_6F_{13}$, —$C_4F_9$, or —$C_3F_7$; R and $R_2$ are each independently hydrogen or alkyl of 1 to 20 carbon atoms; n is an integer from 2 to 11; and x is an integer of at least 1.

Another aspect of the present invention is a method for modifying the surface chemistry of a polymeric substrate comprising adding less than 10 wt % of a surface active agent derived from a block copolymeric material having the Formula I structure wherein ∼∼∼ represents a bond in a polymerizable or polymer chain; $R_f$ is —$C_6F_{13}$, —$C_4F_9$, or —$C_3F_7$; R and $R_2$ are each independently hydrogen or alkyl of 1 to 20 carbon atoms; n is an integer from 2 to 11; and x is an integer of at least 1.

Another aspect of the present invention is a polymerized foam composition made from a mixture containing one or more of monomers, oligomers, and polymers, the mixture comprising less than 10 wt % of a surface active agent derived from a block copolymeric material having at least one mer unit in its backbone having the Formula I structure wherein $R_f$ is —$C_6F_{13}$, —$C_4F_9$, or —$C_3F_7$; R and $R_2$ are each independently hydrogen or alkyl of 1 to 20 carbon atoms; n is an integer from 2 to 11; and x is an integer of at least 1. Another aspect of the invention is an article comprising the polymerized foam composition. An examples of an article is a pressure sensitive adhesive tape.

As used herein:

"block copolymer" means a polymer having at least two compositionally discrete segments, e.g., a di-block copolymer, a tri-block copolymer, a random block copolymer, and a star-branched block copolymer;

"continuous" means that reactants enter a reactor at the same time (and, generally, at the same rate) that polymer product is exiting the same reactor;

"di-block copolymer" or "tri-block copolymer" means a polymer in which all the neighboring monomer units (except at the transition point) are of the same identity, e.g., AB is a di-block copolymer comprised of an A block and a B block that are compositionally different, ABA is a tri-block copolymer in which the A blocks are compositionally the same, but different from the B block, and ABC is a tri-block copolymer in which the A, B, and C blocks are all compositionally different;

"end functionalized" means a polymer chain terminated with a single functional group on one or both chain ends;

"fluorophilic" means having a strong affinity for fluorinated materials such as fluorinated solvents (e.g., freons, fluorocarbons, etc.);

"froth" means a mass of bubbles in or on a liquid;

"hydrogenated" means fully or partially hydrogenated; i.e., hydrogen has been added to all or some double bonds of an unsaturated molecule;

"hydrophilic" means having a strong affinity for water;

"living anionic polymerization" means, in general, a chain polymerization that proceeds via an anionic mechanism without chain termination or chain transfer. (For a more complete discussion of this topic, see *Anionic Polymerization Principles and Applications*. H. L. Hsieh, R. P. Quirk, Marcel Dekker, NY, N.Y. 1996. Pg 72–127);

"living end" means a stable radical, cation, or anion capable of undergoing further polymerization reactions;

"mer" means a single structural unit of a polymer;

"oleophilic" or "lipophilic" means having a strong affinity for oils and hydrocarbons (e.g., benzene, toluene, hexanes, alkanes, THF, alcohols, ethers, ketones, etc.);

"plug" means a three dimensional slice of the reaction mixture;

"polydispersity" means the weight average cell diameter divided by the number average cell diameter; polydispersity is reported on a polydispersity index (PDI);

"random block copolymer" means a copolymer having at least two distinct blocks wherein at least one block comprises a random arrangement of at least two types of monomer units;

"reaction zone" means that portion of a reactor or reactor system where the majority of reaction occurs;

"residence time" means the time necessary for a theoretical plug of reaction mixture to pass completely through a reactor;

"star-branched block polymer" or "hyper-branched block copolymer" means a polymer consisting of several linear block chains linked together at one end of each chain by a single branch or junction point, also known as a radial block copolymer (See *Anionic Polymerization Principles and Applications*. H. L. Hsieh, R. P. Quirk, Marcel Dekker, NY, N.Y. 1996. Pg 333–368);

"surface active agent" means a material that migrates to the surface or interface when added to a bulk material;

"temperature profile" means the temperature or temperatures experienced by a reaction mixture plug over time as it moves through a reactor (For example, if the temperature is constant through the reactor, the temperature profile will have a zero slope; if the temperature increases through the reactor, the profile will have a positive slope); and "temperature sensitive monomer" means a monomer susceptible to significant side reactions such as degradation, cross-linking, and chain scission with reactive sites, such as carbonyl groups, on the same, or different, polymer chain as the reaction temperature rises.

An advantage of at least one embodiment of the present invention is that the novel material compositions provide the ability to modify surfaces of plastics when blended into the plastics in small amounts.

A surprising advantage of at least one embodiment of the present invention is that methacrylic species comprising a Formula I mer unit are anionically polymerizable in hydrocarbon solvents at room temperature. This is a significant advantage that makes these block copolymeric materials more commercially viable and lower cost than alternative materials.

Other features and advantages of the invention will be apparent from the following detailed description, and claims.

DETAILED DESCRIPTION

This application discloses the incorporation of a fluorinated monomer into a polymer backbone in a highly controlled fashion to provide materials that have a controlled polymeric architecture. The novel compositions of the present invention are block copolymers or end-functionalized polymers that contain the fluorinated moiety of Formula I. At least one mer unit having the Formula I structure is incorporated into at least one segment of a block copolymer of the present invention.

An aspect of the invention is the synthesis of block copolymers, such as di- and tri-block copolymers, random block copolymers, starbranched block copolymers, and end-functionalized polymers containing a Formula I monomer unit via living anionic solution polymerizations.

One embodiment of the present invention is an AB diblock copolymers comprising at least one unit of the fluorinated moiety of Formula I in one or both blocks. Further embodiments of this invention include multiblock, random block, star-branched block, and end-functional copolymers where at least one block segment contains one unit of the fluorinated moiety of Formula I.

Another embodiment of the present invention is a new material that contains three distinct types of materials: a hydrophilic block, a lipophilic block, and a fluorophilic block. These materials are generally considered mutually incompatible or immiscible (at low molecular weights). However, in this embodiment of the present invention, they are incorporated as separate blocks into a single copolymer molecule. This triblock structure can then be dissolved in aqueous, hydrocarbon, or fluorinated solvents. Because of their solubility in a wide variety of solvents, these copolymers may offer improved or enhanced performance as surfactants, novel compatibilizers, coatings, gels, and structured micelles.

Several embodiments of the present invention demonstrate the utility of these fluorinated polymers as surface active agents (surfactants). Fluorochemical containing surfactants are well known in the art (see, e.g., U.S. Pat. Nos. 2,803,615 and 3,787,351; Amphoteric Surfactants, edited by Eric G. Lomax, Marcel Dekker Inc. (1996), p. 13; Organofluorine Chemicals and their Industrial Applications, edited by R. E. Banks, Ellis Horwood Ltd. (1979), p. 56; J. O. Hendrichs, *Ind. Eng Chem*, 45, 1953, p. 103; M. K. Bernett and W. A. Zisman, *J. Phys. Chem.*, 63, 1959, p. 1912). The controlled polymer architecture of the materials of this invention provides tailorable miscibility in a variety of solvents, monomers, and polymers, while maintaining surface activity.

One aspect of this invention is that the some embodiments of the materials can readily stabilize cellular polymeric membranes when added into various monomeric and/or polymeric systems (e.g., curable acrylic monomer/polymer mixtures including froths that comprise gas and polymerizable material). It is preferable to add less than 10 wt %, more preferably less than about 5 wt %, and most preferably less than about 1 wt % of a surface active agent derived from a block copolymeric material of the present invention. These materials provide for and control the formation of a large number of small cells or voids in the membrane, which leads simultaneously to the formation of a cellular membrane with low density and an opaque, uniform appearance. The properties and methods of making cellular pressure-sensitive adhesive (PSA) membranes of this type are described in U.S. Pat. No. 4,415,615 (Esmay), incorporated herein by reference. Cellular PSA membranes or foam tapes can be made not only by forming a cellular polymeric membrane that has PSA properties, but also by applying a layer of PSA to at least one major surface of a cellular polymeric membrane.

Another aspect of the present invention is that some embodiments of the materials can reduce the surface tension of liquids. For this purpose, it is preferable to add less than 10 wt %, more preferably less than about 5 wt %, and most preferably less than about 1 wt % of a surface active agent derived from a block copolymeric material of the present invention. Reducing the surface tension of a liquid can be useful for reducing viscosity and improving wettability.

Another aspect of the present invention is that some embodiments of the materials can modify the surfaces of polymeric substrates and plastics when a small amount is blended into the plastic. When a fluorinated polymer of the present invention is added into a polymeric material or plastic using standard compounding processes (e.g. melt extrusion), the resulting surface properties of the plastic can be modified. This can potentially provide unique surface attributes to the plastic including: antifouling, scratch resistance, lubrication, printability, and others. The amount of fluorinated polymer added to a plastic is preferably less than about 10 wt %, more preferably less than about 5 wt %, and most preferably less than about 1 wt %.

The block copolymers of the present invention can be made using living polymerization techniques known to those skilled in the art, including anionic, cationic and living radical polymerizations. In living systems, polymerization can be initiated by reaction of an anionic source (e.g., initiator), with anionically polymerizable monomers. These reactions are typically highly exothermic and are air and/or moisture sensitive. They generally proceed until all residual monomer is consumed. Upon complete monomer consumption, the "living," and hence reactive, chain may be quenched or treated with the same monomer at a later point along the reactor profile to form higher average molecular weight homopolymers. These anionically produced "living" chains can also serve as precursors to a number of different polymer architectures.

Di- and tri-block copolymers can be made by polymerizing one type of monomer to form a living chain, then mixing these chains with a second type of monomer, then a third type if desired. In this manner, di- and tri-block copolymers can be made by living anionic polymerization. Additional blocks of monomers can further be added. Exemplary di- and tri-block copolymers have structures such as AB, ABA, and ABC.

Mixing different types of monomers in the first step of the reaction can produce living chain random copolymers, formed by random initiation and propagation of the constituent monomers. Subsequently mixing the living chains with one or more anionically polymerizable monomer(s) results in resumption of polymerization and the formation of a new block in a resulting block copolymer where each block can consist of a random copolymer of different monomers.

Star- or hyper-branched block copolymers can be synthesized by addition of difunctional reagents to living anionic polymerizations. The difunctional monomers can couple polymer chains resulting in branching further polymerization. Alternatively living anionically produced chains can be coupled by multifunctional or multisite quenching agents to produce starbranched materials. Suitable difunctional reagents include divinyl benzene (DVB), vinylbenzyl chloride and dimethacrylic monomers such as hexanediol dimethacrylate (HDDMA), which may be used as comonomers for the production of starbranched materials.

It is also to make a polymer having a combination of the above-described types of blocks. For example, a polymer may comprise one or more random blocks and one or more homogeneous blocks, e.g., A/random or A/random/B.

End-functionalized polymeric materials can be synthesized by using functional initiators or by end-capping. The end-functionalized materials of the present invention may comprise any type of polymeric structure that contains at least one unit of Formula I in its backbone. These materials may be, for example, homopolymers, di- and tri-block copolymers, random copolymers, block copolymers, and star-branched block copolymers. They may be end-functionalized at one or both ends. For those functionalized at both ends, the functional groups may be the same or different. End-functionalization strategies for living polymerization methods known in the art can be used to provide these materials (For a more complete discussion of this topic, see H. L. Hsieh, et al., Anionic Polymerization Principles and Applications, (Marcel Dekker, New York, 1996) pp. 261–307).

The polymeric materials of the present invention may comprise blocks derived from the hydrogenation of diene-based block copolymers. The hydrogenation produces blocks that are polyolefinic in nature. Particularly useful materials are hydrogenated poly(butadiene), polyisoprene, poly(1,3-pentadiene), and poly(1,3-cyclohexadiene), which may be made via "living" anionic polymerization. Hydrogenation of such polydienes produces various polyolefins, the nature of which is controlled by the polymer backbone microstructure. For example hydrogenation of poly(1,4-butadiene) produces a polyethylene-like structure, while hydrogenation of poly(1,2-butadiene) produces a polyethylethylene (ie. polybutylene) structure.

Hydrogenation of blocks can be performed by various routes including homogeneous diimide reduction as described by Hahn in *J. Polym. Sci:Polym Chem.*, 1992, 30, 397, and by heterogeneous Pd catalyzed reduction as described by Graessley in *J. Polym. Sci;Polym Phys. Ed.*, 1979, 17, 1211. The diimide reduction involves the use of organic reducing agents such as p-toluenesulfonhydrazide in the presence of a trialkyl amine (i.e., tripropyl amine) and xylene as a solvent at temperatures of 140° C. They polymeric materials of the present invention may also include blocks comprising acid and/or anhydride mer units. Examples of suitable acid and anhydride monomers include (meth)acrylic acid and (meth)acrylic anhydride.

The reaction mixture of the present invention comprises an anionically-polymerizable system typically comprising a fluorinated monomer, at least one anionically polymerizable monomer, an initiator system, and solvent. The function of the initiator system is to generate anions in the presence of the monomer. The function of the solvent system is to facilitate mobility of the monomers, initiator system, and the polymer produced as well as serving as a partial heat sink.

The fluorinated monomer of the present invention has the following Formula:

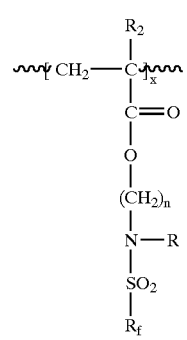

I wherein ~~~ represents a bond in a polymerizable or polymer chain; $R_f$ is —$C_6F_{13}$, —$C_4F_9$, or —$C_3F_7$; R and $R_2$ are each independently hydrogen or alkyl of 1 to 20 carbon atoms; n is an integer from 2 to 11; and x is an integer of at least 1.

The anionically-polymerizable monomers suitable for the compositions of the present invention can be formed from temperature sensitive, non-temperature sensitive monomers, or a combination of one or more type of temperature sensitive monomer and one or more type of non-temperature sensitive monomer. Temperature sensitive mer unit(s) may be at any location in the resulting polymeric material.

Anionically-polymerizable monomers are those that generally have a terminal unsaturated carbon-carbon bond. Examples include vinyl aromatics, styrenics, dienes, vinyl pyridines, alkyl methacrylates, epoxides (e.g., ethylene and propylene oxide), oxiranes, cyclic sulfides (e.g., thiiranes), lactones, lactides, cyclic carbonates, lactams, cyclosiloxanes (e.g., hexamethyltrisiloxane), ethylene oxide, acrylonitrile, and [n]metallocenophanes as well as anionically-polymerizable polar monomers Suitable vinyl aromatic monomers include, for example, styrene, α-methylstyrene, p-methylstyrene, methyl-4-styrene, methyl-3-styrene, ethyl-4-styrene, dimethyl-3,4-styrene, trimethyl-2,4,6-trimethylstyrene, tert-butyl-3-styrene, dichloro-2-6-styrene, vinyl naphthalene, and vinyl anthracene. Polymerizable dienes include, for example, isoprene, isoprene-derivatives, butadiene, and 1,3-pentadiene. Anionically-polymerizable polar monomers include, for example, vinyl pyridine, vinyl pyridine derivatives, 2-vinyl pyridine, and 4-vinyl-pyridine, t-butyl acrylate and methacrylic monomers such as tert-butyl methacrylate, methyl methacrylate, isodecyl methacrylate, allyl methacrylate, and glycidyl methacrylate. Vinyl pyridine-containing materials as described in Luxton et. al., *Polymer* 1978, 19, 1320 and Klein, J. W.; Lamps, J.-P.; Gnanou, Y.; Rempp, P. *Polymer* 1991, 32, 2278 can be used in the present invention.

Other suitable monomers include those that have multiple reaction sites. For example some monomers may have at least two anionically-polymerizable sites. This type of monomer will produce branched polymers. This type of monomer preferably comprises less than 10 molar percent of a given reaction mixture because higher amounts tend to lead to a high degree of crosslinking in addition to branching.

Another example of a suitable monomer is one that has at least one functionality that is not anionically-polymerizable in addition to at least one anionically polymerizable site. Such functionalities are known in the art and include those that are reactive by the following mechanisms: condensation, ring opening, nucleophilic displacement, free radical coupling, photolytic coupling, and hydrosilylation.

Initiators particularly useful with specific monomers are well known in the art. Initiators compatible with the exemplary monomer systems discussed herein are summarized in Hsieh, et al., Anionic Polymerization: Principles and Practical Applications, Chapters 5 and 23 (Marcel Dekker, New York, 1996). For example, for vinyl pyridine, preferred initiators include n-butyl lithium, sec-butyl lithium, tert-butyl lithium, fluorenyl lithium, naphthyllithium, phenyllithium, and p-tolyllithium.

Functional anionic initiators can also be used to provide end-functionalized polymers. These initiators are typically suitable for initiating diene, methacrylate and styrenic polymerizations using techniques known to those skilled in the art. Various functional groups can be incorporated onto the end of a polymer chain using this strategies including: alcohol(s), thiol(s), carboxylic acid, and amine(s). In each of these cases, the initiator must contain protected functional groups that can be removed using post polymerization techniques. Suitable functional initiators are known in the art and are described in, e.g., U.S. Pat. Nos. 6,197,891; 6,160,054; 6,221,991; and 6,184,338. These initiators contain tertiary alkyl or trialkylsilyl protecting groups that can be removed by post polymerization deprotection. Tert-alkyl-protected groups can also be removed by reaction of the polymer with para-toluenesulfonic acid, trifluoroacetic acid, or trimethylsilyliodide to produce alcohol, amino, or thiol functionalities. Additional methods of deprotection of the tert-alkyl protecting groups can be found in T. W. Greene and P. G. M. Wuts, Protective Groups in Organic Synthesis, Second Edition, Wiley, New York, 1991, page 41. Tert-butyldimethylsilyl protecting groups can be removed by treatment of the polymer with acid, such as hydrochloric acid, acetic acid, para-toluenesulfonic acid. Alternatively, a source of fluoride ions, for instance tetra-n-butylammonium fluoride, potassium fluoride and 18-crown-6, or pyridine-hydrofluoric acid complex, can be employed for deprotection of the tert-butyldimethylsilyl protecting groups. Additional methods of deprotection of the tert-butyldimethylsilyl protecting groups can be found in T. W. Greene and P. G. M. Wuts, Protective Groups in Organic Synthesis, Second Edition, Wiley, New York, 1991, pages 80–83.

End-functionalized materials can also be synthesized by adding reagents that contain reactive halogen or unsaturated groups capable of quenching a "living" anionic polymerization as described above. Anionic polymerizations are not readily amenable to the polymerization of monomers containing relatively acidic, proton-donating groups such as amino, hydroxyl, thiol, carboxyl or acetylene functional groups. However, these groups can be included in a polymer via incorporation in functional quenching agents ($A_{fn}$), if the acidic groups are protected by suitable protecting groups that are stable to the conditions of anionic polymerization. The protecting groups can subsequently be removed by post polymerization treatments. Examples of suitable functional quenching agents include chlorosilanes, alkyl halides, epoxides, maleates, 1,1'-diarylethylenes, imines, aldehydes, esters, and ketones (For a more complete discussion of this topic, see H. L. Hsieh, et al., Anionic Polymerization Principles and Applications, (Marcel Dekker, New York, 1996) pp. 261–307).

By using a combination of a functional initiator and a functional quenching agent, it is possible to produce polymers having a single functional group at one or both chain ends. Depending on the specific initiator/quenching agent pair utilized, it is possible to have either the same or different functionality at each chain end. As another example, for alkyl methacrylate, preferred initiators include less reactive initiators, due to their decreased propensity to react with ester carbonyl groups, such as 1,1-diphenylhexyllithium or other carbanions of diphenylmethane and oligomeric α-methylstyryl monomers such as α-methylstyrene-lithium. The anionic polymerization of alkyl methacrylates is typically conducted in THF at low temperatures (e.g., −78° C.). However, with the addition of additives such as lithium chloride and lithium t-butoxide, some room temperature polymerizations may be done. Some methacrylate reactions (e.g., glydidyl methacrylate) are not hindered by the polymerization of materials that contain functional groups. Other polymerizable methacrylate systems include n-, iso-, sec- and t-butyl magnesium bromide, t-butyl lithium with triethyl, tributyl, triisobutyl, or trooctylaluminum in toluene at −78° C., aluminum porphyrin compounds in methylene chloride solvents at a range of temperatures (−90° C. to −20° C.), cumyl cesium in THF at up to 20° C., and lithium ester enolates of ethyl isobutyrate in toluene at 20° C. with lithium t-butoxide added lithium chloride. α-methylstyryl-lithium, and 1,1-diphenylhexyllithium are the preferred initiators for alkyl methacrylates in THF, cylclohexane, or toluene. Use of initiators and solvents for the monomer systems discussed herein is summarized in Hsieh, et al., Anionic Polymerization: Principles and Practical Applications, Chapters 5 and 23 (Marcel Dekker, New York, 1996).

Because the polymerized monomers of the present invention have "living" ends, subsequent monomers may be added without additional initiators, e.g., when a block copolymer is being made.

Solvents compatible with specific monomers are well known in the art. Solvents compatible with the exemplary monomer systems discussed herein are summarized in Hsieh, et al., Anionic Polymerization: Principles and Practical Applications, Chapters 5 and 23 (Marcel Dekker, New York, 1996). One or more solvents can be used as a reaction solvent system. The amount of solvent is preferably sufficient to solubilize the reaction components (including additional monomer added downstream) and the resulting product. Preferably the solids loading of the monomers in the solvent is 10 to 50 weight %. When monomers are polar, preferred solvents include benzene, ethylbenzene, cyclohexane, toluene, tetrahydrofuran and xylene. Co-solvents such as dialkyl ethers, (diethyl ether, dibutyl ether), tetrahydrofuran, or tetramethylene diammine may also be used for both polar and nonpolar monomer systems.

The materials of the invention may be modified by further reactions such as desterification, deprotection, grafting, etc. These types of modifications are discussed in more detail in co-pending patent application U.S. Ser. No. 10/211415.

The compositions of the present invention may be made by any process suitable for carrying out a "living" polymerization technique. Various apparatus are suitable for carrying out this type of reaction. The process may be carried out using a batch, semi-batch or continuous reactor. Another alternative is a parallel batch reactor. A vacuum-fitted kneader may be used to carry out the reaction. A suitable kneader is described in more detail in the Examples section. Other suitable reactors include continuous stirred tank reactors (CSTR), tubular reactors, stirred tubular reactors (STR) or combinations of STRs and extruders, such as those described in co-pending U.S. patent application Ser. No. 09/500,155, plug flow reactors (PFR), temperature controlled stirred tubular reactors as described in WO 0158962 A1 and co-pending U.S. patent application Ser. No. 09/824,330, static mixers, continuous loop reactor, extruders, shrouded extruders as described in WO 9740929, and pouched reactors as described in WO 9607522 and WO 9607674.

The architecture of the polymeric materials of the present invention can be influenced by a number of factors including temperature or temperature profile in the reactor, the molar ratio of monomers to initiators, and monomer addition sequence. These factors affect the molecular weight, polydispersity, and structure of the final polymeric material.

The average molecular weight of the resultant polymeric material is established by controlling the monomer to initiator ratio. This ratio is established by controlling the respective monomer and initiator flow rates. Narrow molecular weight distributions can be obtained by controlling the temperature of the reaction mixture. Avoiding high temperatures minimizes unwanted side reactions that can result in polymer chains having differing molecular weight averages.

Polydispersity can be influenced by the reaction kinetics of the reaction mixture and the minimization of side reactions, especially when temperature sensitive monomers are present. Maintaining optimum temperatures in each zone of the reactor can positively influence reaction kinetics. Maintaining optimum temperatures can also advantageously affect the solution viscosity and the solubility of the reactants.

The structure of the polymeric material is determined by the sequence of monomer addition(s). Di- and tri-block copolymers are formed when more than one monomer type is introduced sequentially. Random block copolymers are formed when groups of more that one monomer type are introduced simultaneously. Star- or hyper-branched block copolymers are formed when difunctional monomers are introduced into the polymerization mixture. End-functionalized polymers are formed when functional initiators or quenching agents are used.

Quenching agents with multiple reactive sites may be used to couple two living polymer chains thereby increasing average molecular weight. Suitable multifunctional or multisite quenching agents include dimethyl phthalate, phosphorus trichloride, methyltrichlorsilane, silicon tetrachloride, hexachlorodisilane, and 1,2,3-tris (chloromethyl)benzene, dichlorodimethylsilane, dibromo-p-xylene, dichloro-p-xylene, bischloromethylether, methylene iodide, 1-4-dibromo-2-butene, 4-diiodo-2-butene, and 1,2, dibromoethane.

The anionic polymerization of methacrylates can often be accompanied by side reactions such as chain transfer, back-biting, and termination. These phenomena may be suppressed by lowering reaction temperatures or by selective synthetic modification of growing polymer chain ends with 1,1-diphenylethylene to induce more efficient methacrylate initiation.

Objects and advantages of this invention are further illustrated by the following examples. The particular materials and amounts thereof, as well as other conditions and details, recited in these examples should not be used to unduly limit this invention.

EXAMPLES

This invention may be illustrated by way of the following examples.

Test Methods
Molecular Weight and Polydispersity

The average molecular weight and polydispersity of a sample was determined by Gel Permeation Chromatography (GPC) analysis. Approximately 25 mg of a sample was dissolved in 10 milliliters (mL) of tetrahydrofuran (THF) to form a mixture. The mixture was filtered using a Gelman Acrodisc CR 0.2 micron polytetrafluoroethylene (PTFE) syringe filter (available from Pall Life Sciences, Ann Arbor, Mich.). Then about 150 $\mu$L of the filtered solution was injected into a Gel Permeation Chromotography system (GPC) (available from Waters Corporation, Milford, Mass.). The system was composed of a 1515 Isocratic HPLC Pump, a 717 Plus Autosampler, a 2487 Dual Absorbance Detector, and a 2410 Refractive Index Detector (all individually available from Waters Corporation). The system also included STYRAGEL HR 5E and HR 1 size exclusion columns (available from Waters Corporation, Milford, Mass.) that were attached in series. All molecular weights were determined from a calibration curve based on narrow molecular weight distribution polystyrene standards. In all cases, THF was used as the eluent at a flow rate of 1 mL/min. The run time used for all cases was 20 min. Waters BREEZE software package was utilized for data acquisition and calibration.

Composition by Nuclear Magnetic Resonance

The concentration of each block and confirmation of elimination was determined by Nuclear Magnetic Resonance ($^1$H NMR) spectroscopy analysis. A sample was dissolved in deuterated chloroform to a concentration of about 10 wt % and placed in a Varian INOVA 400 or 500 MHz spectrometer each running on a Varian Unity software package (Varian, Palo Alto, Calif.). Block concentrations were calculated from relative areas of characteristic block component spectra and in all cases, 16 transients were collected.

Composition by Infrared Spectroscopy

Samples were run by two methods. In Method A, sample was sliced into small slivers with a scalpel and examined on an IR$\mu$S Spectra-Tech Fourier Transform Infrared Microscope (available from Thermo Spectra-Tech, Shelton, Conn.) used in transmission mode. In Method B, sample was sliced into shall slivers that were melt smeared onto CsBr or KBr crystals and analyzed in transmission mode on a Bomem MB-100 Fourier Transform Infrared Spectrometer (available from ABB Bomen, Quebec City, Canada).

ESCA Surface Analysis

Electron Spectroscopy for Chemical Analysis or ESCA was utilized to characterize the elemental surface composition in selected samples. In all cases, a Perkin Elmer model 5100 ESCA apparatus was utilized. The surface of each sample was analyzed using two take off angles (20 and 45 degrees) to determine the dependence of surface composition vs. depth profile. At a 20 degree take off angle, the first 20 Angstrom units of depth into the surface is sampled and likewise 45 Angstrom units of a surface depth is sampled at a 45 degree take off angle.

Froth Stability Test

Frothing experiments were performed as follows on libraries of synthesized diblock copolymers. Homogeneous solutions of isooctyl acylate (IOA) containing 2 wt % of each diblock copolymer were first prepared in a vial. The solutions were subjected to a flow of nitrogen through a size "C" gas dispersing tube (commercially available from Aldrich Chemical Co., Milwaukee, Wis.) inserted into the liquid. The solutions were sparged with nitrogen for about 5 to 10 seconds and the TOA monomer was frothed as a result. The nitrogen stream was subsequently removed and a timer started. The timer was allowed to run until the froth completely disappeared and the time was recorded. This experiment was repeated for each copolymer/IOA solution in triplicate.

Materials Used

| Material | Description |
| --- | --- |
| MeFBSEMA | 2-(N-methylperfluorobutanesulfonamido)ethyl methacrylate available from 3M Corporation, St. Paul, Minnesota. |
| sec-Butyl lithium | An anionic initiator, 1.3 Molar in cyclohexane, available from Aldrich Chemical Co., Milwaukee, Wisconsin. |
| Toluene | Available from Worum Chemical, St. Paul, Minnesota. |
| Cyclohexane | Available from Ashland Chemical Company, General Polymers Division, Shakopee, Minnesota. |
| t-Butyl methacrylate | Available from Sans Esters Corp., New York, New York. |
| 1,1'-Diphenylethylene | Available from Acros/Fisher Scientific, Itasca, Illinois. |
| Isoprene | Available from Aldrich Chemical Co., Milwaukee, Wisconsin. |
| Tetrahydrofuran (THF) | Available from ISP Technologies, Wayne, New York. |
| t-Butyl methacrylate | Available from Sans Esters Corp., New York, New York. |
| PP 1024 | Polypropylene resin commercially available from ExxonMobil Chemical, Baytown, TX |
| Isooctyl Acrylate (IOA) | Available from Aldrich Chemical Co., Milwaukee, Wisconsin |

Monomer Preparation and Handling

The reactant monomers in the following examples (styrene, t-butyl methacrylate, isoprene, MEFBSEMA in toluene, and 1,1'diphenylethylene in cyclohexane) were nitrogen sparged until the $O_2$ concentration was less than 1 part per million (ppm). In the case of MEFBSEMA, the monomer was recrystallized from hot toluene and washed with anhydrous heptane and dried overnight at room temperature in a vacuum oven. Deoxygenated monomer was pumped through a column (l=50 cm, d=2 cm) of basic alumina ($Al_2O_3$, Aldrich, Brockmann I, about 150 mesh, 5.8 nm). The purified monomer was then fed directly to a stirred tubular reactor (STR). Reaction solvents (cyclohexane, THF) were pumped through molecular sieve beads (available as Zeolite 3A from UOP, Chickasaw, Ala.) and fed directly to the STR. Initiator, 1.3 Molar (M) sec-butyl lithium in cyclohexane, was diluted by addition of pre-purified cyclohexane.

Continuous Synthesis Reactor

The STR had a capacity of 0.94 L and consisted of five jacketed (shell-and-tube) glass sections (Pyrex cylinders). The tube had an inner diameter of 3.01 cm and an outer diameter of 3.81 cm. The shell had a diameter of 6.4 cm. All five sections were 25.4 cm long. The sections were joined together with polyvinyl chloride (PVC) connector disks. The STR was closed off at the front with a PTFE disk and at the end with a PVC disk. Extending through the center of the joined cylinders was a 0.95 cm diameter stainless steel shaft suspended along the cylinder axis by shaft alignment pins. To the shaft were affixed 30 detachable rectangular stainless steel paddles with approximately 2.1 cm between each paddle. The paddles were 1.6 mm thick, 1.91 cm wide, and 2.54 cm long. Each section contained six paddles. The shaft was attached to a $\frac{1}{14}$ hp variable speed motor and driven at approximately 125 rpm.

Heat transfer was accomplished by attachment of recirculators to the jackets. All zones were heated or cooled with water. Zones 1 and 2 were attached in series so that they were controlled at the same temperature by a recirculator (Model 9105, Fischer Scientific, Hanover Park, Ill.). Zone 1 was heated/cooled in a co-current manner while zone 2 was done in a counter-current fashion. Zone 3 was independently controlled using a separate recirculator (Model RTE 110, Thermo Neslab, Portsmouth, N.H.) and was heated/cooled in a counter-current manner. Zones 4 and 5 were attached in series so that they were controlled at the same temperature by a temperature controller (Model M3, MGW Lauda, Lauda-Königshofen, Germany) and were heated/cooled in a counter-current manner.

Automated Reactor

Polymerizations were performed batch-wise using a Mettler-Toledo Bodhan NEPTUNE PB Automated Workstation (Mettler-Toledo Bodhan, Vernon Hills, Ill.) equipped with: two transportable septum piercing cannulas, one Pressurized Reaction Block Synthesizer HPB-900, one PRB Dual Reagent Rack (1×6 reagent & 3×8 vial configuration), 2 Diagger Vortex Genie 2 Vortex Mixers (Scientific Industries Inc., Bohemia N.Y.), one Mettler AT-200 Analytical Balance, one ETS Model 512B Automatic Humidity Controller (Electro-Tech Systems, Inc. Glenside Pa.) and a valve-operated, multi-gas handling system.

The HPB-900 consisted of two sets of 3×2 reaction vessels, resulting in a 3×4 matrix of 12 reaction vessels with a working volume of about 25 mL each. Each reaction vessel was equipped with a disposable glass vial (KIMBAL 50965D-7 Shell Vial, available from VWR Scientific Products, Willard Ohio). Stirring was facilitated by use of rare earth magnets (SmCo available from Variomag-USA, Daytona Beach, Fla.). Each vessel was individually stirred by use of a Variomag Telemodul 40 S Controller (Variomag-USA). Temperatures in the HPB-900 were controlled via use of an external FP-50 HD Recirculating Heat Transfer Unit (available from Julabo USA Inc., Kutztown, Pa.).

Reagents were transferred from septum-capped bottles (available as Wheaton Media Bottles from Wheaton Scientific Products, Millville, N.J.) to the individual reaction vessels via the transportable septum-piercing cannula. Quantities were specified and measured with Sequence Building Software Pressurized Reaction Block NEPTUNE Version 1.11 (available from Mettler-Toledo Bodhan) using Windows NT-4.0 (available from Microsoft, Redmond, Wash.) and Bodhan Mapping Software Version 1.2 (Mettler-Toledo Bodhan).

The following class of materials were fed into different septum-caped bottles and blanketed with nitrogen. The first class consisted of purified monomers, each in their own bottle. The second class was reaction solvent, either cyclohexane or toluene, that were first pumped through molecular sieve beads (available as Zeolite 3A from UOP, Chickasaw, Ala.) and then fed into their own bottles. The third class of material was initiator that consisted of 1.3 Molar (M) sec-butyl lithium in cyclohexane that was further diluted with pre-purified cyclohexane. All manipulations of the above chemicals were performed in an inert atmosphere glove box (Model MO-10/20 available from Vacuum Atmospheres Co., Hawthorne, Calif.).

Vacuum Reactor

The vacuum reactor (MKD 0,6-H60 IKAVISC Measuring Kneader (available from IKA Labortechnik, Janke & Kunkel Gmbh & Co KG, Germany) consisted of a kneading trough that held 600 ml and had a working volume of 300 mL. The bottom of the trough was double-walled to allow the batch to be heated via a hot oil circulator. Kneading was accomplished with two kneading paddles that move kneading medium both horizontally and vertically. The paddles continually wiped the walls and each other. A port was in the lid of the kneader so a vacuum could be pulled and liquid could be introduced.

The speed of the kneader paddles was controlled with an RE 162/P Analog Controller (available from IKA Labortechnik). The speed of the paddles could range from 0.5 to 64 rpm. Torque was measured with a Vise MS Torque Meter (available from IKA Labortechnik). Temperature was measured from within a paddle with an Ikatron DTM11 (available from IKA Labortechnik). Vacuum was measured digitally with a vacuum meter (available as 375 Convection Vacuum Meter from Granville Phillips Boulder, Colo.). The paddles were driven with a DC motor part of kneader that had a constant power output of 160 W. The motor was mounted downstream from a gear assembly that was capable of transmitting a torque of 60 Nm. The vacuum reactor was heated by a EXOCAL EX-250 HT High Temperature Bath equipped with a High Temperature Bath Controller/Readout with a temperature range of 40° C. to 250° C. (both available from Thermo Neslab, Portsmouth, N.H.). A heat transfer fluid (a $C_{11}$ to $C_{25}$ petroleum hydrocarbon available as STEFRIFLUSH from Petro-Canada, Calgary, Alberta, Canada) was used in the bath. Vacuum was supplied via a double stage rotary vacuum pump (Model RV5, displacement of 117 L/min, ultimate vacuum without gas ballast of $1.5 \times 10^{-3}$ torr, maximum inlet pressure for water vapor of 5.1 kPa (38 torr), 0.373 kW (½ hp), available from Boc Edwards, Wilmington, Mass.). The condensate was collected in two evacuated, high vacuum glass solvent traps that were submersed in dewars of liquid nitrogen.

Example 1

Batch Synthesis of Polystyrene-b-MeFBSEMA

This example illustrates the making of styrene-based semifluorinated di-block copolymers.

A solution was formed by first adding purified styrene (0.60 mL, 2.62 mmol) into a dry 25 mL round-bottomed flask fitted with a septum and magnetic stir bar. Then purified cyclohexane (10 mL) was charged into the flask via syringe and the resulting solution was purged with argon for 5 min. Sec-butyllithium (0.40 mL, 0.310 mmol) was then charged into the flask with a syringe. The color of the solution became orange, indicating the presence of polystyryllithium anion. The solution was allowed to stir at room temperature for 30 min. Then purified diphenylethylene (0.1 mL, 0.56 mmol) was added to the solution with a syringe and the components were allowed to react for an additional 30 min. During this time the solution gradually became deep red, indicative of the presence of the diphenyllithium anion. A sample of the solution was taken to determine molecular weight characteristics prior to further reaction.

The reaction solution was then cooled to just above 0° C. and a cyclohexane solution (1.0 g, 2.60 mmol in 5 mL) of purified MeFBSEMA was added to the reaction vessel. The resulting reaction caused the solution to turn yellow-green in color. The solution was allowed to stir for an addition 60 min. and quenched with the addition of methanol. The quenched polymer solution was poured into 250 mL of methanol to precipitate the polymer. The polymer was collected via filtration as a white powder and dried under vacuum for 2 hours to yield 1.15 g (88.0% found weight/expected weight The material was tested for Molecular Weight and Polydispersity, and Composition By NMR. Results are shown in Table 1.

TABLE 1

| Sample | $M_n \times 10^3$ | PDI | Styrene Mole % | MeFBSEMA Mole % |
|---|---|---|---|---|
| 1 | 3.6 | 1.96 | 44.1 | 55.9 |

In addition, comparisons between calculated structure and actual structure were made. These are shown in Table 2

TABLE 2

| Target | Actual |
|---|---|
| MW PS: 1.7 kg/mol | 1.6 kg/mol, PDI = 1.10 (GPC, PS Standards) |
| MW PS-MeFBSEMA diblock: 5.9 kg/mol | 3.6 kg/mol, PDI = 1.96 (GPC, PS standards) |
| Diblock: 50.0 mol % PS, 50.0 mol % MeFBSEMA | 44.1 mol % PS, 55.9 mol % MeFBSEMA ($^1$H NMR) |

The NMR spectra indicated PS Ar—$\underline{H}$ ($\delta$ 6.6–7.1 ppm, broad m), MeFBSEMA CO$_2$—$\underline{CH_2}$ ($\delta$ 3.80–4.35 ppm, broad m), MeFBSEMA SO$_2$—$\underline{NCH_2}$, SO$_2$—$\underline{NCH_3}$ ($\delta$ 3.05–3.40 ppm, broad m) and MeFBSEMA CH$\underline{CH_2}$, MeFBSEMA $\underline{CH_3}$, PS $\underline{CH, CH_2}$ ($\delta$ 0.5–2.2 ppm, broad m Example 2

Automated Batch Synthesis of Polystyrene-b-MeFBSEMA

This example illustrated variations of styrene-based semi-flourinated di-block copolymer.

Variations of Polystyrene-b-MeFBSEMA were made with an automated reactor. For each sample, styrene (30 wt % in cyclohexane) was charged into the reactor. Then s-BuLi (0.19 M in cyclohexane) was charged into the reactor and an orange color developed. The reaction was allowed to stir for 30 min. at room temperature and then the diphenylethylene (14.1 wt % in cyclohexane) was added to the reaction. After 15 min., MeFBSEMA (27 wt % in toluene) was charged into the reactor, the solution was allowed to stir at room temperature for an additional 60 minutes and quenched by methanol addition to the solution. The polymer solution was poured into 250 mL of methanol to precipitate the polymer. The polymer was then collected via filtration. The types and quantities of materials used for each sample are listed in Table 3.

TABLE 3

| Example | s-BuLi ($\times 10^{-4}$ moles) | Styrene ($\times 10^{-3}$ moles) | MeFBSEMA ($\times 10^{-3}$ moles) | % Solids |
|---|---|---|---|---|
| 2A | 5.81 | 1.74 | 1.74 | 15.6 |
| 2B | 5.81 | 1.74 | 2.90 | 17.9 |
| 2C | 5.81 | 1.74 | 4.07 | 19.5 |
| 2D | 5.81 | 1.74 | 5.23 | 20.6 |
| 2E | 5.81 | 1.74 | 6.39 | 21.4 |
| 2F | 5.81 | 2.90 | 1.74 | 16.5 |
| 2G | 5.81 | 2.90 | 2.90 | 18.6 |
| 2H | 5.81 | 2.90 | 4.07 | 20.0 |
| 2I | 5.81 | 2.90 | 5.23 | 21.0 |
| 2J | 5.81 | 2.90 | 6.39 | 21.7 |
| 2K | 5.81 | 4.07 | 1.74 | 17.4 |
| 2L | 5.81 | 4.07 | 2.90 | 19.2 |
| 2M | 5.81 | 4.07 | 4.07 | 20.4 |
| 2N | 5.81 | 4.07 | 5.23 | 21.3 |
| 2O | 5.81 | 4.07 | 6.39 | 22.0 |
| 2P | 5.81 | 5.23 | 1.74 | 18.1 |
| 2Q | 5.81 | 5.23 | 2.90 | 19.7 |
| 2R | 5.81 | 5.23 | 4.07 | 20.8 |
| 2S | 5.81 | 5.23 | 5.23 | 21.6 |
| 2T | 5.81 | 5.23 | 6.39 | 22.2 |
| 2U | 5.81 | 6.39 | 1.74 | 18.8 |
| 2V | 5.81 | 6.39 | 2.90 | 20.2 |
| 2W | 5.81 | 6.39 | 4.07 | 21.2 |
| 2X | 5.81 | 6.39 | 5.23 | 21.9 |

The samples were tested for Molecular Weight and Polydispersity, and Composition By NMR. Results are shown in Table 4. The ability of the materials to maintain a nitrogen froth in Isooctyl Acrylate (IOA) was determined using the Frothing Stability Test described above. The results are summarized in Table 4. The compositional dependence of froth stability is clearly demonstrated. The most asymmetric versions of the PS-MeFBSEMA diblock copolymers have the highest froth stability. Generally, materials with longer PS chains and shorter fluorinated chains are the most stable.

TABLE 4

| Example | $M_n \times 10^3$ | PDI | Styrene (Mole %) | MeFBSEMA (Mole %) | Average Froth Stability (min.) |
|---|---|---|---|---|---|
| 2A | 1.7 | 1.28 | 18.1 | 81.9 | 1.0 |
| 2B | 1.8 | 1.61 | 29.9 | 70.1 | 0.6 |
| 2C | 1.9 | 2.33 | 64.3 | 35.7 | 0.4 |
| 2D | 1.8 | 2.08 | 65.6 | 34.4 | 0.8 |
| 2E | 1.3 | 1.26 | 35.2 | 64.8 | 0.7 |
| 2F | 2.1 | 1.29 | 76.1 | 23.9 | 2.4 |
| 2G | 2.1 | 1.31 | 87.1 | 12.9 | 86.2 |
| 2H | 2.2 | 1.84 | 67.1 | 32.9 | 0.9 |
| 2I | 2.4 | 2.11 | 73.0 | 27.0 | 0.9 |
| 2J | 2.2 | 2.67 | 56.4 | 43.6 | 1.0 |
| 2K | 2.5 | 1.34 | 75.0 | 25.0 | 3.8 |
| 2L | 2.3 | 2.40 | 84.5 | 15.5 | 2.7 |
| 2M | 1.4 | 1.35 | 82.5 | 17.5 | 5.9 |
| 2N | 2.4 | 1.60 | 82.8 | 17.2 | 20.0 |
| 2O | 2.5 | 2.22 | 67.4 | 32.6 | 1.2 |
| 2P | 2.4 | 1.30 | 93.9 | 6.1 | 107.0 |
| 2Q | 2.0 | 1.45 | 91.5 | 8.5 | 135.3 |
| 2R | 2.6 | 1.71 | 89.6 | 10.4 | 1.5 |
| 2S | 2.8 | 2.01 | 89.5 | 10.5 | 2.7 |
| 2T | 2.8 | 1.78 | 86.3 | 13.7 | 150.0 |
| 2U | 3.6 | 1.32 | 92.1 | 7.9 | 107.0 |
| 2V | 3.2 | 1.48 | 89.5 | 10.5 | 107.0 |
| 2W | 3.0 | 1.81 | 91.9 | 8.1 | 119.6 |
| 2X | 3.1 | 1.47 | 90.9 | 9.1 | 3.0 |

Example 3

Continuous synthesis of Poly(isoprene-2-(N-methylperfluorobutane sulfonamido)ethyl methacrylate)

This example illustrates the making of diene-based semi-flourinated di-block copolymers.

To make examples 3A and 3B, an initiator slurry was prepared by mixing 150 g of 1.3 M sec-butyl lithium solution with 10000 g of dry, oxygen-free cyclohexane and stirring at room temperature for about 30 minutes. A solution of 1,1'-diphenylethylene in cyclohexane was prepared by mixing 13.9 g of diphenylethylene in 924 g of pre-purified cyclohexane. A solution of 2-(N-methylperfluorobutane-sulfonamido)ethyl methacrylate in toluene, solids of about 20 wt %, was prepared by adding 400 g of monomer to 2000 g of toluene. Also, a solution of 2-(N-methylperfluoro-butanesulfonamido)ethyl methacrylate in toluene, solids of about 40 wt %, was prepared by adding 400 g in 1000 g of toluene.

Purified isoprene monomer (fed at a rate of 13 ml/min by a reciprocating piston pump) and initiator slurry in cyclohexane (pumped at a rate of 14 ml/min by a reciprocating piston pump) were fed into the first zone of the continuous synthesis reactor. THF was also added to the first zone of the reactor, pumped via a reciprocating piston pump at a rate of 3 mL/min. A color change from clear to yellow was observed in zone 1 when the initiator solution contacted the monomer. The temperature of the reaction mixture in each of the 5 zones of the reactor was individually maintained at: #1=60° C., #2=60° C., #3=20° C., #4=20° C., and #5° C.

The materials flowed through the first three zones facilitated by stirring paddles along the reaction path. Polymerization continued to substantially 100% completion by the end of zone 4, thereby forming a "living" polyisoprene reaction mixture. At the start of zone 4, the solution of diphenylethylene in cyclohexane, solids of about 12 wt %, was added by a reciprocating piston pump (at a rate of 10.0 ml/min) to the "living" polyisoprene reaction mixture. This resulted in addition of a diphenylethylene-modified polyisopropenyl chain. This chain was treated at the start of zone 5 with a purified solution of 2-(N-methylperfluorobutane-sulfonamido)ethyl methacrylate in toluene, solids of 20 wt % (fed by a reciprocating piston pump at rates of 2 and 10 ml/min) to form poly(isoprene-2-(N-methylperfluoro-butanesulfonamido)ethyl methacrylate) block copolymers. The overall solids content of these reactions was about 32 wt %. The total residence time for these reactions was about 25 minutes.

Also, at a later point in the experiment the 20 wt % solution of 2-(N-methylperfluorobutane-sulfonamido)ethyl methacrylate in toluene was switched with a more concentrated solution of a 40 wt % solution, which was fed to the start of zone 5 by a reciprocating piston pump at a rate 10 ml/min. The PI-MEFBSEMA materials were collected in 1 gallon glass jars, concentrated under reduced pressure in a vacuum oven and precipitated by adding the viscous solutions to methanol. The molecular weight and Composition of these materials were determined by GPC and $^1$H NMR respectively.

Example 3C was made by the same process as 3A and 3B, with the following changes. 1.3 M sec-butyl lithium solution in cyclohexane was used as recieved, with no dilution by cyclohexane. α-Methylstyrene was used in place of 1,1'diphenylethylene and was also used without dilution. A solution of 2-(N-methylperfluorobutanesulfonamido)ethyl methacrylate in toluene, solids of about 33 wt %, was prepared by adding 1000 g of monomer to 2000 g of toluene.

Purified isoprene monomer (fed at a rate of 9 ml/min by a reciprocating piston pump), toluene (fed at a rate of 32 ml/min by a reciprocating piston pump) and 1.3 M sec-butyl lithium solution in cyclohexane (pumped at a rate of 16 ml/min by a reciprocating piston pump) were fed into the first zone of the continuous synthesis reactor. THF was also added to the first zone of the reactor, pumped via a reciprocating piston pump at a rate of 1 mL/min. α-Methylstyrene was added by a reciprocating piston pump (at a rate of 2.9 ml/min). 2-(N-methylperfluorobutanesulfonamido)ethylmethacrylate in toluene, solids of 33 wt % was fed by a reciprocating piston pump at 33 ml/min) to form poly(isoprene-2-(N-methylperfluorobutanesulfonamido)ethyl methacrylate) block copolymers. The overall solids content of these reactions was about 25 wt %. The total residence time for these reactions was about 14 minutes.

Thee results are summarized in Table 5.

TABLE 5

| Example | $M_n$ (× 10$^4$) | PDI | 1,2-Isoprene Mole % | 1,4-Isoprene Mole % | 3,4-Isoprene Mole % | MeFBSEMA Mole % |
|---|---|---|---|---|---|---|
| 3A | 6.96 | 1.54 | 14.9 | 18.2 | 65.7 | 1.2 |
| 3B | 6.48 | 2.16 | 19.6 | 11.9 | 51.5 | 1.9 |
| 3C | 1.15 | 1.32 | 0.2 | 68.0 | 18.1 | 13.7 |

Example 4

Continuous STR Synthesis of Poly(2-(N-methylperfluorobutanesulfonamido) ethyl methacrylate-t-butyl methacrylate) (P(MeFBSEMA-t-BMA))

This example illustrates the making of methacrylate based semiflourinated di-block copolymers.

An initiator slurry was prepared by mixing 50 g of 1.3 M sec-butyl lithium solution with 600 g of dry, oxygen-free cyclohexane and slowly adding 16.8 g of 1,1'-diphenylethylene with stirring at room temperature, resulting in the formation of 1,1'-diphenylhexyllithium Purified t-BMA monomer (fed at a rate of 12 ml/min by a reciprocating piston pump), cyclohexane (fed at a rate of 17 ml/min by a reciprocating piston pump), and the initiator slurry in cyclohexane (pumped at a rate of 10 ml/min by a reciprocating piston pump) were fed into the first zone of the STR. A color change from clear to light green was observed in zone 1 when the initiator solution contacted the monomer. The temperature of the reaction mixture in each of the 5 zones of the STR was individually maintained at: #1=30° C., #2=30° C., #3=25° C., #4=25° C., and #5=25° C. The materials flowed through the first four zones facilitated by stirring paddles along the reaction path. Polymerization continued to substantially 100% completion by the end of zone 4, thereby forming a "living" poly(t-butyl methacrylate) reaction (P(t-BMA)) mixture.

Then the polymer was made into a block copolymer. The MeFBSEMA solution was fed into zone 5 by a reciprocating piston pump at a rate of 7 ml/min and reacted with P(t-BMA). The overall solids content of both polymerization reactions was about 29.7 wt %. The total residence time for these reactions was ca. 20 minutes. The result was (P(MeFBSEMA-t-BMA)) block copolymer with a mole ratio MeFBSEMA to t-BMA of 17 to 83, $M_n$ of 8.2×10$^4$ and a PDI of 1.97.

Example 5

Batch synthesis of Poly(2-(N-methylperfluorobutanesulfonamido)ethyl methacrylate)-b-methacrylic anhydride/acid) via the p-toluenesulfonic acid catalyzed hydrolysis of Poly (2-(N-methylperfluorobutanesulfonamido) ethyl methacrylate-t-butyl methacrylate) (P(MeFBSEMA-t-BMA))

This example illustrates the making of semifluorinated methacrylic anhydride/acid diblocks.

P(MeFBSEMA-t-BMA) (120 g) was loaded into a vacuum reactor (MKD 0,6-H60 IKAVISC Measuring Kneader, Janke & Kunkel Gmbh & Co KG, Germany) set at 147° C. and agitated at a speed of 67 RPM to create a torque of 14 Nm). A vacuum of about 4.0 kPa (30 torr) was applied for 5 minutes to evaporate any possible residual solvent. The batch temperature of the kneader was increased to 160° C., when p-toluenesulfonic acid monohydrate (1 g in 10 ml THF) was siphoned into the reactor and the internal vacuum of the reactor was re-established at about 4.0 kPa. After 15 minutes, the color of the starting material, P(MeFBSEMA-t-BMA), had changed from yellow to dark brown, and the measured torque had increased to 17 Nm. At this point, the contents of the reactor were sampled for analysis and removed from the reactor.

Samples were tested by Infrared Spectroscopy, which confirmed that hydrolysis had occurred. The spectra illustrated characteristic IR resonances indicative of the formation of anhydride functionalities at 1802 cm$^{-1}$ and 1760 cm$^{-1}$ and the presence of methacrylic acid at 1709 cm$^{-1}$.

Example 6

Continuous STR Synthesis of Poly(styrene-t-butyl methacrylate-2-(N-methylperfluorobutanesulfonamido) ethyl methacrylate) (P(S-t-BMA MeFBSEMA))

This example illustrates the making of semiflourinated styrenic-diene-triblock copolymers via anionic polymerizations.

An initiator slurry was prepared by mixing 115 g of 1.3 M sec-butyl lithium solution with 3000 g of dry, oxygen-free cyclohexane with stirring at room temperature. A 26 wt % solution of MeFBSEMA in toluene was prepared by dissolving 260 g of MeFBSEMA in 962 ml of toluene. A 2.5 wt % solution of 1,1'-diphenylethylene in cyclohexane, was prepared by mixing 33 g of 1,1'-diphenylethylene in 1273 g of pre-purified cyclohexane.

Purified styrene monomer (fed at a rate of 5.5 ml/min by a reciprocating piston pump), cyclohexane (fed at a rate of 11 ml/min by a reciprocating piston pump) and the initiator slurry in cyclohexane (pumped at a rate of 10 ml/min by a reciprocating piston pump) were fed into the first zone of the STR. A color change from clear to orange was observed in zone 1 when the initiator solution contacted the monomer. The temperature of the reaction mixture in each of the 5 zones of the STR was individually maintained at: #1=53° C., #2=53° C., #3=52° C., #4=47° C., and #5=25° C.

The materials flowed through the first zone thereby forming a "living" polystyrene reaction mixture. At the start of zone 2, the 2.5 wt % solution of 1,1'-diphenylethylene in cyclohexane was added by a reciprocating piston pump (at a rate of 4.4 ml/min) to the "living" polystyrene reaction mixture, resulting in a 1,1'-diphenylethylene-modified polystyrenyl chain.

At the start of zone 3, purified t-BMA monomer (fed at a rate of 5.5 ml/min by a reciprocating piston pump) was added to the 1,1'-diphenylethylene-modified polystyrenyl chain and a color change from burgandy to light green was observed, indicative of a "living" poly(t-butyl methacrylate) chain.

At the start of zone 5 was added a 26 wt % solution of MeFBSEMA in toluene (by a reciprocating piston pump at a rate of 2.2 ml/min) which reacted with (P(t-BMA)). The overall solids content of this polymerization reaction was about 31 wt %. The total residence time for these reactions was ca. 29 minutes. The result was the formation of a P(S-t-BMA-MeFBSEMA) triblock copolymer. The P(S-t-BMA-MeFBSEMA) materials were collected in 1 gallon glass jars, concentrated under reduced pressure in a vacuum oven and precipitated by adding the viscous solutions to methanol. At various times during the reaction, the MeFBSEMA flow rate was varied. The block copolymer composition was varied in both number average molecular weight and polydispersity index as a function of time as shown in Table 6.

TABLE 6

| Example | Time (min) | Methacrylate (mole %) | PS block (mole %) | MeFBSEMA (mole %) | Methacrylate Monomer (mole %) |
|---|---|---|---|---|---|
| 6A | 0 | 43.4% | 55.5% | 1.1% | 0.0% |
| 6B | 20 | 44.9% | 49.0% | 3.1% | 0.0% |
| 6C | 65 | 34.2% | 58.2% | 7.6% | 0.0% |
| 6D | 77 | 38.8% | 57.3% | 4.0% | 0.0% |
| 6E | 97 | 43.0% | 54.5% | 2.5% | 0.0% |
| 6F | 108 | 16.2% | 74.1% | 9.7% | 0.0% |
| 6G | 115 | 17.3% | 73.8% | 5.0% | 4.0% |

Example 7

Batch synthesis of poly(styrene-b-methacrylic anhydride/acid-b-2-(N-methylperfluorobutanesulfonamido)ethyl methacrylate)) via the p-toluenesulfonic acid catalyzed hydrolysis of poly(styrene-b-t-butyl methacrylate-b-2-(N-methylperfluorobutanesulfonamido)ethyl methacrylate This example illustrates the making of semifluorinated methacrylic anhydride/acid triblocks via the use of the vacuum reactor.

P(S-t-BMA-MeFBSEMA) (150 g) was loaded into a vacuum reactor (MKD 0,6-H60 IKAVISC Measuring Kneader, Janke & Kunkel Gmbh & Co KG, Germany) set at 160° C. and agitated at a speed of 67 RPM to create a torque of 18 Nm). A vacuum of about 533 Pa (4 torr) was applied for 5 minutes to evaporate any possible residual solvent. The batch temperature of the kneader was increased to 170° C., when p-toluenesulfonic acid monohydrate (1 g in 10 ml THF) was siphoned into the reactor and the internal vacuum of the reactor was re-established at about 533 Pa. After 20 minutes, the color of the starting material, P(S-t-BMA-MeFBSEMA) had changed from white to dark brown, and the measured torque had increased to 31 Nm. At this point, the contents of the reactor were sampled for analysis and removed from the reactor.

Samples were tested by Infrared Spectroscopy, which confirmed that hydrolysis had occurred. The spectra illustrated characteristic IR resonances indicative of the formation of anhydride functionalities at 1802 $cm^{-1}$ and 1760 $cm^{-1}$ and the presence of methacrylic acid at 1709 $cm^{-1}$.

Example 8

Batch synthesis of poly(styrene-b-methacrylic acid-b-2-(N-methylperfluorobutanesulfonamido)ethyl methacrylate)) via the p-toluenesulfonic acid catalyzed solution hydrolysis of P(S-t-BMA-MeFBSEMA)

This example illustrates the making of semifluorinated methacrylic acid diblocks.

To a stirred solution of P(S-t-BMA-MeFBSEMA) (30 g) in toluene (150 ml) was added p-toluenesulfonic acid (1 g). The reaction mixing was heated to 80° C. for 8 hrs. Samples were tested by Infrared Spectroscopy, which confirmed that hydrolysis had occurred. The spectra illustrated characteristic IR resonances indicative of the formation of methacrylic acid at 1709 $cm^{-1}$.

Example 9

Hydrogenated Poly(isoprene-2-(N-methylperfluorobutanesulfonamido)ethyl methacrylate)

This example illustrates the making of semifluorinated hydrogenated poly(isoprene) or poly(ethylene/propylene or PEP) diblocks.

Table 7 summarizes the known hydrogenation conditions for these polyisoprene-based block copolymers. In general the PI-based systems were dissolved and loaded into agitated pressure vessels. After initial nitrogen sparging, these solutions are pressurized with hydrogen, agitated and heated to the targeted temperature. These hydrogenations were performed by Pressure Chemical Co. (Pittsburgh, Pa.) by a trade secret process.

Hydrogenation of polyisoprene systems can be performed by various routes including homogeneous diimide reduction as described by Hahn in *J. Polym. Sci:Polym Chem.* 1992, 30, 397, and by heterogeneous Pd catalyzed reduction as described by Graessley *J. Polym. Sci;Polym Phys. Ed.*, 1979, 17, 1211.

TABLE 7

| Ex. | Starting Material | Mass Polymer (grams) | Mass Cyclohexane (grams) | Mass Toluene (grams) | $M_n$ (× 10⁴) | PDI | Saturated Isoprene (mole %) | Unsaturated Isoprene | 2$^{nd}$ Block (mole %) |
|---|---|---|---|---|---|---|---|---|---|
| 9A | PEP-MeFBSEMA | 80 | 49 | 725 | 5.77 | 1.44 | 69.8 | 29.5 | 0.6 |

Example 10

Modification of Polymer Surfaces via Addition of Fluorinated Block Copolymer from Example 3C This example illustrates the ability of fluorinated block copolymers of this invention to modify polymer surfaces when mixed into the bulk polymer matrix at low levels.

Samples were prepared by melt mixing the fluorinated block copolymer into a polyolefin resin in a batch kneader, compression molding the resulting mixture between two liners, and conducting surface analysis of the resulting films and liners using ESCA and contact angle characterization techniques. In example 10A, 38 g of polyproplyene resin (PP 1024, commercially available from Exxon Co, melt flow index=12) was melt mixed with 2 g of PI-MeFBSEMA (from Example 3C). The materials were added to a batch kneader (Brabender Torque Rheometer Model PL2100, with a Type 6 mixer head utilizing roller blade mixing paddles), which was heated to 210° C. and run at 50 rpm. After mixing for 6 min, approximately 10 g of blended material was removed from the kneader. Film samples were subsequently generated by placing this material between two sheets of untreated polyester (50µ thickness), which were placed between 2 aluminum plates (⅛ inch thick each). Two shims (1/16 inch thick) were placed to either side of the mixture between the liners such that upon pressing the assembled stack, the mixture would not come into contact with either shim. This stack of materials was then placed in a hydraulic press (Wabash MPI model G30H-15-LP) having each platen heated to 410° C. The stack was pressed for 1 minute at 1500 psi (10 MPa). The hot stack was then moved to a low pressure water-cooled press for 30 seconds to cool the stack. The stack was disassembled and the liners were removed from both sides of the film disc that resulted from pressing the mixture. In the case of Comparative Example 10A, identical conditions were used to melt mix 40 g of PP 1024 and prepare the sample, but fluorinated block copolymer from Example 3C was omitted from the formulation. Comparative Example 10B is the polyester film that the samples were pressed between. In Example 10A, the surface of the blend of PP and fluorinated block copolymer from Example 3C was analyzed. The film disc and the liners were then tested using ESCA and water goniometry for surface composition and interfacial characteristics. The ESCA technique was performed using a Perkin Elmer model 5100 ESCA apparatus. The water goniometry technique was conducted on a Rame-hart NRL C.A.Goniometer, model #100-00-115 using distilled water. The results of the contact angle measurements are given in Table 8 and the results of the ESCA surface analysis are given in Tables 9 and 10. ESCA analysis for Example 10A at different take-off angles (20 vs 45 degrees) indicated that the concentration of fluorinated block copolymer increases as the depth of penetration of the ESCA analysis is decreased (as incident angle is increased, depth of penetration is increased).

TABLE 8

| Example | Average Water Contact Angle (sample) | Average Water Contact Angle (liner) |
|---|---|---|
| 10A | 92.7 | 34.2 |
| CE 10A | 101.6 | 74.3 |
| CE 10B | N/A | 67.1 |

TABLE 9

| | ESCA (20 degree) | | |
|---|---|---|---|
| Example | Carbon % | Fluorine % | Oxygen % |
| 10A | 83.8 | 9.4 | 5.3 |
| CE 10A | 98.9 | — | 1.2 |
| CE 10B | 69 | — | 27.9 |

TABLE 10

| | ESCA (45 degree) | | |
|---|---|---|---|
| Example | Carbon % | Fluorine % | Oxygen % |
| 10 A | 89.7 | 5.1 | 4.0 |
| CE 10A | 98.8 | — | 1.2 |

Various modifications and alterations that do not depart from the scope and spirit of this invention will become apparent to those skilled in the art. This invention is not to be unduly limited to the illustrative embodiments set forth herein.

What is claimed is:

1. A composition comprising a block copolymer having at least one mer unit in its backbone having the following formula

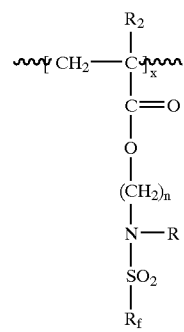

wherein ∿∿ represents a bond in a polymerizable or polymer chain; $R_f$ is —$C_3F_7$; R and $R_2$ are each independently hydrogen or alkyl of 1 to 20 carbon atoms; n is an integer from 2 to 11; and x is an integer of at least 1.

2. The composition of claim 1 wherein the block copolymer is a star-branched block copolymer.

3. The composition of claim 1 wherein the block copolymers are di- or tri-block copolymers having AB, ABA, or ABC architectures.

4. The composition of claim 1 wherein at least one of the blocks in a random copolymer of at least two monomeric species.

5. The composition of claim 1 wherein at least one of the blocks is selected from the group consisting of vinyl aromatics, styrenics, dienes, vinyl pyridines, alkyl methacrylates, epoxides, oxiranes, cyclic sulfides, lactones, lactides, cyclic carbonates, lactams, cyclosiloxanes, acrylonitrile, [n]metallocenophanes, and anionically-polymerizable polar monomers.

6. The composition of claim 2 wherein at least one of the blocks is derived from a hydrogenated polydiene block.

7. The composition of claim 3 wherein the block copolymer contains at least three blocks wherein each block has one of the following properties hydrophilic, lipophilic, and fluorophilic.

8. The composition of claim 1 having acid or anhydride functionality in at least one block.

9. A composition comprising at least one block selected from the group consisting of vinyl aromatics, styrenics, dienes, vinyl pyridines, epoxides, oxiranes, cyclic sulfides, lactones, lactides, cyclic carbonates, lactams, cyclosiloxanes, acrylonitrile, and [n]metallocenophanes; and having at least one mer unit in its backbone having the following formula

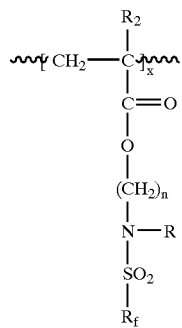

wherein ᴧᴧᴧ represents a bond in a polymerizable or polymer chain; $R_f$ is —$C_4F_9$, or —$C_3F_7$; R and $R_2$ are each independently hydrogen or alkyl of 1 to 20 carbon atoms; n is an integer from 2 to 11; and x is an integer of at least 1.

10. The composition of claim 9 wherein $R_f$ is —$C_4F_9$.

11. The composition of claim 9 wherein the block copolymer is a star-branched block copolymer.

12. The composition of claim 9 wherein the block copolymers are di- or tri-block copolymers having AB, ABA, or ABC architectures.

13. The composition of claim 9 wherein at least one of the blocks is a random copolymer of at least two monomeric species.

14. The composition of claim 11 wherein at least one of the blocks is derived from a hydrogenated polydiene block.

15. The composition of claim 12 wherein the block copolymer contains at least three blocks wherein each block has one of the following properties hydrophilic, lipophilic, and fluorophilic.

16. The composition of claim 9 having acid or anhydride functionality in at least one block.

17. A composition comprising an ABC tri-block, or star-branched block or random block copolymer having at least one mer unit in its backbone having the following formula

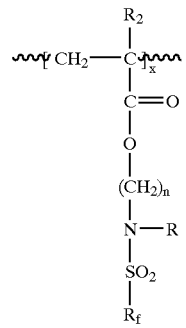

wherein ᴧᴧᴧ represents a bond in a polymerizable or polymer chain; $R_f$ is —$C_4F_9$ or —$C_3F_7$; R and $R_2$ are each independently hydrogen or alkyl of 1 to 20 carbon atoms; n is an integer from 2 to 11; and x is an integer of at least 1.

18. The composition of claim 17 wherein $R_f$ is —$C_4F_9$.

19. The composition of claim 17 wherein at least one of the blocks is a random copolymer of at least two monomeric species.

20. The composition of claim 17 wherein at least one of the blocks is selected from the group consisting of vinyl aromatics, styrenics, dienes, vinyl pyridines, alkyl methacrylates, epoxides, oxiranes, cyclic sulfides, lactones, lactides, cyclic carbonates, lactams, cyclosiloxanes, acrylonitrile, [n]metallocenophanes, anionically-polymerizable polar monomers.

21. The composition of claim 17 wherein at least one of the blocks is derived from a hydrogenated polydiene block.

22. The composition of claim 17 wherein the block copolymer contains at least three blocks wherein each block has one of the following properties hydrophilic, lipophilic, and fluorophilic.

23. The composition of claim 17 having acid or anhydride functionality in at least one block.

24. A composition comprising an end-functionalized polymer having in its backbone at least one mer unit having the following formula

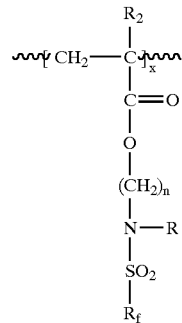

wherein ᴧᴧᴧ represents a bond in a polymerizable or polymer chain; $R_f$ is —$C_6F_{13}$, —$C_4F_9$, or —$C_3F_7$; R and $R_2$ are each independently hydrogen or alkyl of 1 to 4 carbon atoms; n is an integer from 2 to 10; and x is an integer of at least 1.

25. The composition of claim 24 wherein the polymer is end-functionalized with a single reactive group.

26. The composition of claim 24 wherein each end of the polymer is end-functionalized with a single reactive group.

27. The composition of claim 26 wherein the reactive groups are different.

* * * * *

UNITED STATES PATENT AND TRADEMARK OFFICE
CERTIFICATE OF CORRECTION

PATENT NO. : 6,903,173 B2
DATED : June 7, 2005
INVENTOR(S) : Cernohous, Jeffrey J.

It is certified that error appears in the above-identified patent and that said Letters Patent is hereby corrected as shown below:

<u>Title page</u>,
Item [56], References Cited, U.S. PATENT DOCUMENTS, below "6,350,820" insert
-- 6,492,477 B1       12/2002      Savu et al. --.
OTHER PUBLICATIONS, "Marc R. Nyden, et al.," reference, delete "Troughput" and insert -- Throughput --, therefore.
"Article: Busse et al.," reference, delete "Behaviro" and insert -- Behavior --, therefore.

<u>Column 2</u>,
Line 16, delete "$C_6F_{13}$" and insert -- $C_6F_{13}$ --, therefore.

<u>Column 11</u>,
Line 29, delete "TOA" and insert -- IOA --, therefore.

<u>Column 16</u>,
Line 47, delete "5° C." and insert -- 5=20°C. --, therefore.

<u>Column 23</u>,
Line 5, delete "in" and insert -- is --, therefore.

<u>Column 24</u>,
Line 17, after "-$C_4F_9$" insert -- , --.

Signed and Sealed this

Twentieth Day of September, 2005

JON W. DUDAS
*Director of the United States Patent and Trademark Office*